(No Model.) 3 Sheets—Sheet 1.

M. CATTORI.
CONDUIT FOR ELECTRIC RAILWAYS.

No. 526,963. Patented Oct. 2, 1894.

Fig. 3. Fig. 3ª. Fig. 3ᵇ.

WITNESSES:
O. M. McKay
John Lolka

INVENTOR
M. Cattori
BY
Munn & Co
ATTORNEYS.

(No Model.) 3 Sheets—Sheet 2.
M. CATTORI.
CONDUIT FOR ELECTRIC RAILWAYS.
No. 526,963. Patented Oct. 2, 1894.
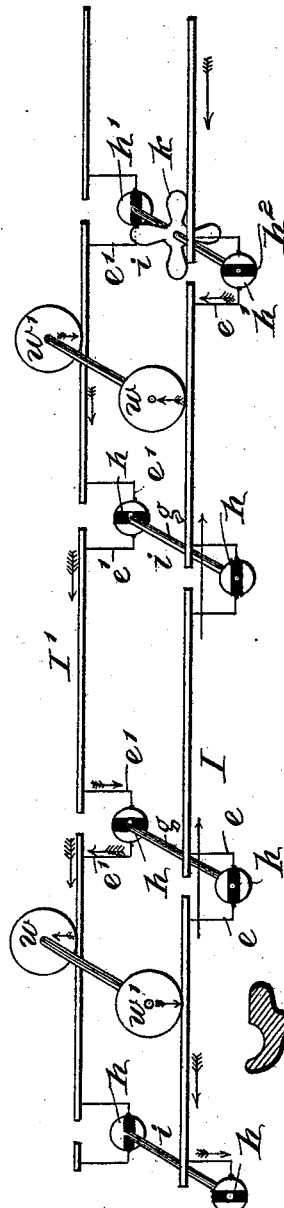
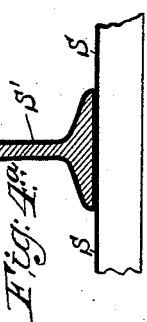
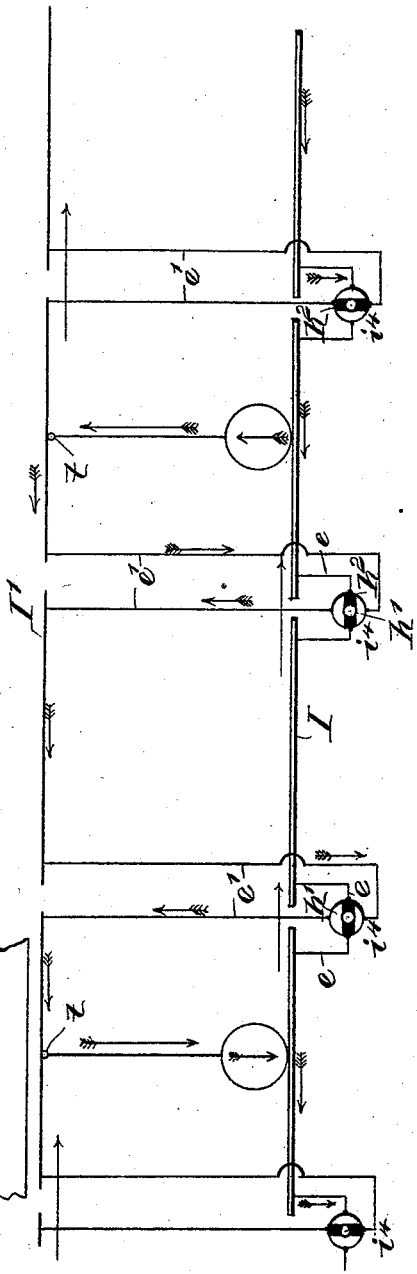
WITNESSES:
E. M. McKay
John Locke
INVENTOR
M. Cattori
BY
Munn & Co
ATTORNEYS.

(No Model.) 3 Sheets—Sheet 3.
M. CATTORI.
CONDUIT FOR ELECTRIC RAILWAYS.
No. 526,963. Patented Oct. 2, 1894.
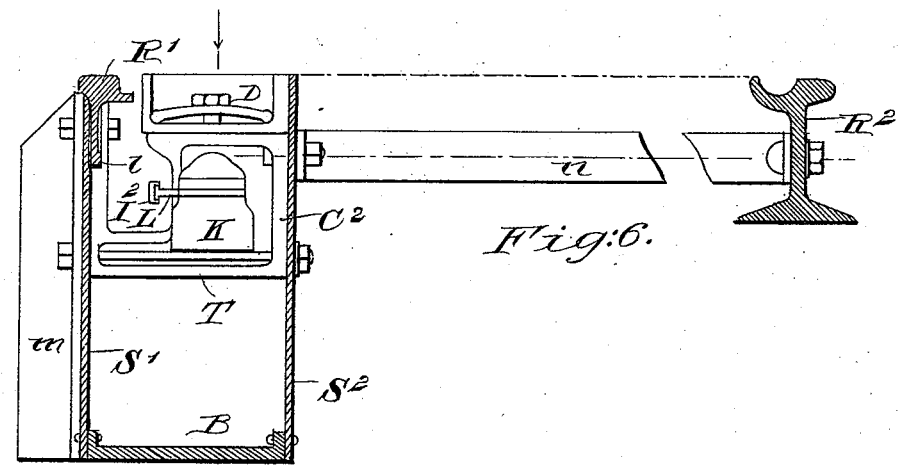
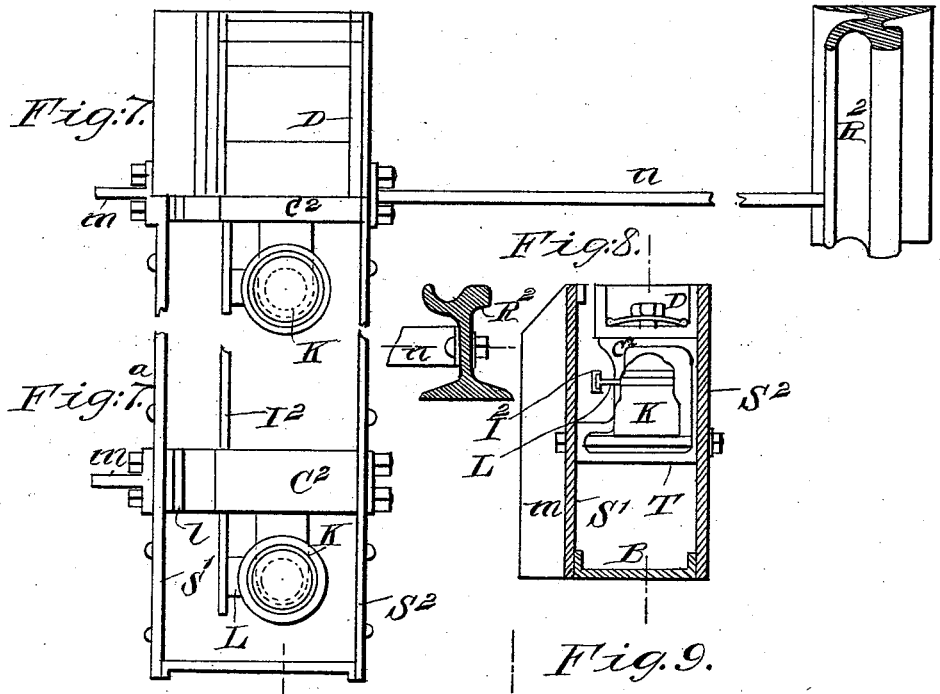
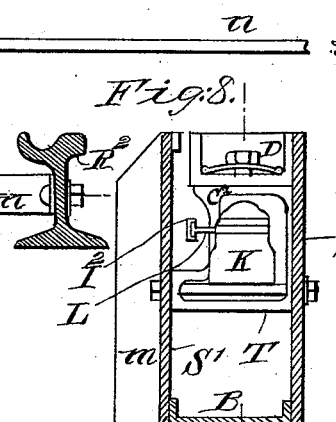
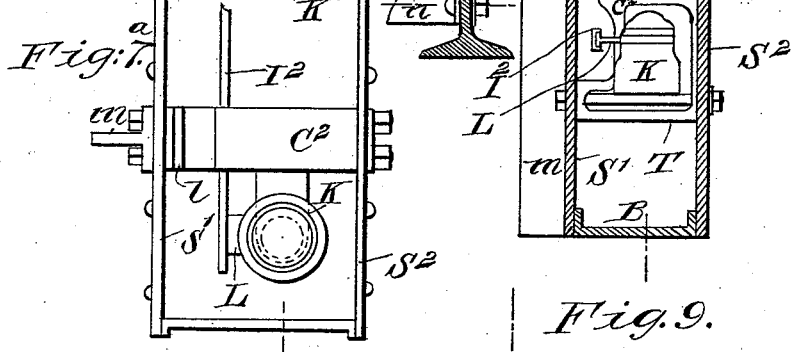
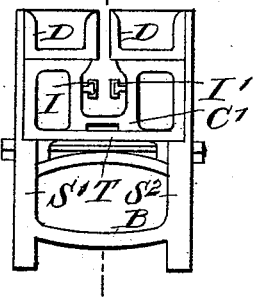
WITNESSES:
O. M. H. Kay
John Lotka
INVENTOR
M. Cattori
BY
Munn & Co
ATTORNEYS.

UNITED STATES PATENT OFFICE.

MICHELANGELO CATTORI, OF ROME, ITALY.

CONDUIT FOR ELECTRIC RAILWAYS.

SPECIFICATION forming part of Letters Patent No. 526,963, dated October 2, 1894.

Application filed April 3, 1894. Serial No. 506,174. (No model.) Patented in Italy May 13, 1893, LXVI, 373, May 24, 1893, LXVI, 419, and August 22, 1893, LXVIII, 75.

*To all whom it may concern:*

Be it known that I, MICHELANGELO CATTORI, a subject of the King of Italy, and a resident of Rome, in the Kingdom of Italy, have invented a new and useful Improvement in Conduits for Electric Railways, (for which I have obtained patents in Italy, Vol. LXVI, No. 373, dated May 13, 1893, Vol. LXVI, No. 419, dated May 24, 1893, and Vol. LXVIII, No. 75, dated August 22, 1893,) of which the following is a specification, reference being had to the accompanying drawings.

Figure 1:
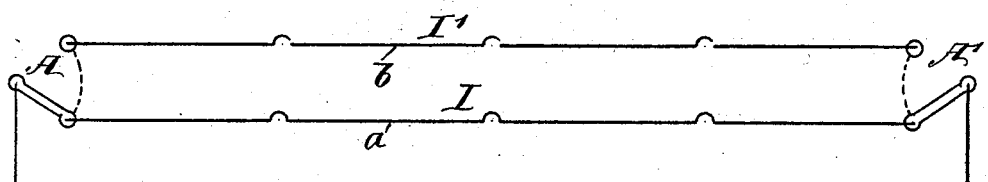
Figure 2:
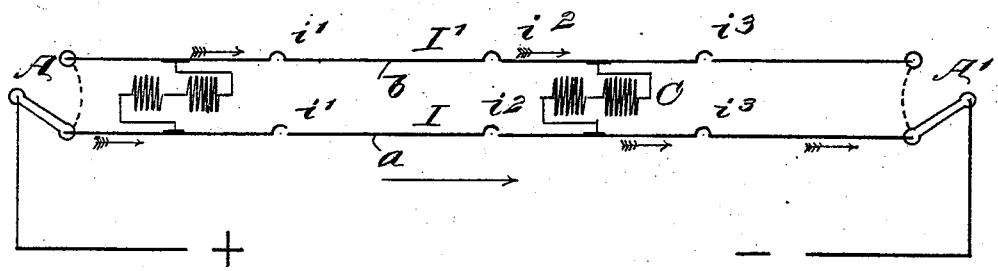
Figure 2:
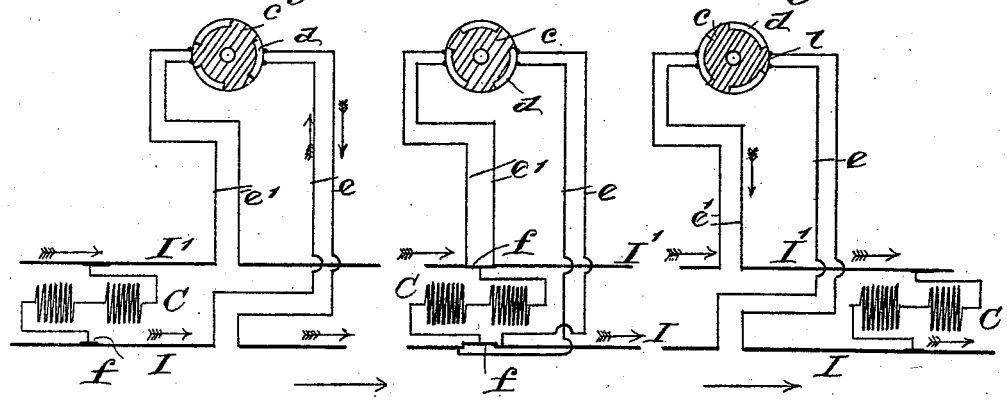

In the said drawings: Figure 1 is a diagram illustrating an electric railway having two parallel conductors arranged according to my invention. Fig. 2 is another diagram showing the same arrangement of conductors, the positions of two motor cars being indicated in this figure. Figs. 3, 3ª and 3ᵇ are diagrammatic views representing a motor car in three different positions relatively to the end of the conductor sections, and showing also the switch for connnecting and disconnecting the ends of the conductor sections. Fig. 4 is a perspective view illustrating an arrangement in which the ordinary track rails are employed as conductors. Fig. 4ª is a cross section of a track rail partially coated with an insulating substance. Fig. 5 shows the combination of a special sectional conductor with one formed by the track rails. Fig. 6 is a transverse section of the track and the conduit for an underground conductor. Fig. 7 is a plan of the track and conduit shown in Fig. 6. Fig. 7ª is a plan view of the conduit, the rail R' and the cover D being omitted. Fig. 8 is a transverse sectional elevation of a conduit for an underground conductor, said conduit being adapted to be placed alongside the rails of an existing track to transform any railway into an electric railway; and Fig. 9 is an end view of a section of a similar conduit for two conductors.

Like letters of reference denote corresponding parts throughout the several views.

My invention relates to conductors and conduits for the transmission of electric power, and particularly to conductors and conduits for electric railways.

The object of my invention is to provide a conductor or conductors which will present a high degree of safety against short circuits, to construct such conductors in sections and yet avoid sparking when the electrical connection between two sections is interrupted, to utilize one or both rails of an existing track as electrical conductors, and to provide sectional conduits that will be strong and comparatively light, and adapted to be used either in connection with special rails, or with the ordinary track rails, thereby affording a convenient means of converting any existing railway into an electric railway.

To these ends, my invention consists of certain features of construction and combinations of parts that will be hereinafter described and claimed.

In Figs. 1 to 5, I have shown three different modes of arranging my improved conductors for series system electric railways. The construction of the conductors, however is essentially the same in each of these cases. The conductors I and I' are divided into a series of sections, preferably of equal length, and separated from each other so as to leave a gap between their adjacent ends. The two conductors are arranged essentially parallel to one another, and to each section of one conductor, for instance the section $a$ of the conductor I, corresponds a section $b$, of the other conductor I'. These corresponding juxtaposited sections are practically of equal length. In practice it is preferable to locate the gaps between the conductor sections in alignment transversely of the track, as shown in the drawings.

For closing the gaps between the conductor sections, I provide circuit closers indicated by the reference letters $i'$, $i^2$, $i^3$, in Figs. 1 and 2. These circuit closers are adapted to be operated electrically or mechanically by the cars themselves, or by an operator.

A specific device for operating the circuit closers will be described hereinafter with reference to Fig. 4.

The circuit closers belonging to corresponding sections of the conductors are preferably connected so as to be operated simultaneously, as will be presently described with reference to Fig. 4, or a single common circuit closer may be provided for each two corresponding gaps between the sections of the conductors. These circuit closers are constructed in such a manner that when the electrical connection is established between two adjacent sections of one conductor, the corresponding sections of the other conductor will be disconnected from each other. It will be obvious that it is not necessary to locate the circuit closers in the gaps between the conductor sections, as the said circuit closers may be connected to the conductor sections by means of conducting wires.

In Figs. 3, 3ª and 3ᵇ, I have shown a circuit closer consisting preferably of a rotatable rod or cylinder $c$ made of a suitable insulating material, and spaced conducting plates $d$ secured on the said cylinder. The cylinder is adapted to be turned by a suitable actuating mechanism located on the cars, or in any other convenient manner. On the circumferential surface of the circuit closer are adapted to slide stationary contact pieces connected to the ends of wires $e\ e'$, leading to corresponding adjacent sections of the conductors I and I' respectively. The distance between the said Fig. 3ª. The position the circuit closer assumes when the car has passed to the next conductor sections, as illustrated by Fig. 3ᵇ, is the reverse of that shown in Fig. 3, the wires $e'$, bearing on one of the conducting plates $d$, and the wires $e$ on the insulating portion of the circuit closer.

It will be obvious that there is little or no danger of short circuits with the above described conductors for series system electric railways, even if a person should touch one or both conductors.

The insulation of the conductor sections need not be made with particular care, and this feature of my invention enables me to employ the track rails themselves, as conductors for an electric railway. These rails as shown in Fig. 4ª may be supported on the ordinary cross-ties, which are coated with suitable insulating substances at the points where the rails rest on them. The rails also would a car or train should enter a section on which another car or train is traveling, the motors of the two cars or trains would be connected in parallel, while ordinarily they are connected in series, and the sudden change of speed would at once give a warning to the motormen of the cars or trains. The adjacent ends of the conducting rails belonging to different sections are spaced from each other and adapted to be electrically connected or disconnected by means of circuit closers $i$. The circuit closers consist of a shaft $g$ mounted to turn in suitable bearings preferably arranged below the rails, and disks $h\ h$ secured to the said shaft. The disks consist of two conducting segments $h'$ electrically connected with each other, preferably through the medium of the shaft $g$, and an insulating portion $h^2$. Stationary wires $e\ e'$ are connected to adjacent sections of the conductors I and I' respectively, and the ends of these wires are adapted to slide on the circumferential surfaces of the disks $h$. The disk portions $h'$ and $h^2$, and the ends of the wires $e$ and $e'$ are so arranged relatively to each other, that when one disk is in the proper position to electrically connect two adjacent sections of one conductor, the other disk secured to the same shaft $g$ will be in such position as to disconnect the corresponding sections of the other conductor, as will be readily understood by reference to Fig. 4.

Any suitable means are provided for operating the circuit closers $i$, but preferably the shaft $g$ carries a plurality of arms $k$—four as shown in the drawings at the right-hand end of Fig. 4—adapted to be engaged by projections on the cars, so as to change the position of each circuit closer each time a car or train passes over it. The operation of this system of conductors and circuit closers will be obvious from the drawings, it being understood that the current does not pass directly from one wheel $w$ to the other wheel $w'$, but also passes through the motor of the car.

As illustrated in Fig. 5, only one of the track rails is employed as a conductor I, while the other conductor I' is suspended and forms a sectional overhead conductor adapted to be engaged by a trolley $t$ in the usual manner. The sections of the overhead conductor I' are practically of the same length as the corresponding sections of the "track rail conductor" I, the latter being constructed substantially as above described. The sections of the overhead conductor are spaced at their adjacent ends.

Circuit closers $i^4$, similar to the circuit closers $i$, are arranged at the ends of the conductor sections, and wires $e\ e'$ lead from the adjacent sections of the conductors I and I' respectively to points near the circumferential surfaces of the circuit closers $i^4$, so as to slide on the said surfaces when the circuit closers are turned. The circuit closers consist of rotatable disks or cylinders formed of conducting portions $h'$ which are electrically connected with each other, and insulating portions $h^2$. The ends of the wires $e\ e'$ and the conducting portions $h^2$ are so located relatively to each other that the adjacent sections of the conductor I will be disconnected when the corresponding sections of the conductor I' are connected, and vice versa, in the same manner that I have described with reference to Figs. 1 to 4. The feathered arrows in Figs. 4 and 5, indicate the flow of the electric current.

When it is necessary or desirable to employ underground conductors, I construct a conduit composed of tubular sections adapted to be readily connected. Each of the tubular sections is provided with a lower part forming a drain pipe to prevent the water from rising into the upper part in which the conductor is placed. The conduit is closed on all sides, with the exception of a slot in the top, serving for the passage of a contact arm reaching down from the cars to the conductor, and openings arranged at intervals in the bottom or sides of the conduit, to allow the water to escape therefrom. The conduit may be constructed so as to support the rails, forming a longitudinal tie therefor, as shown in Figs. 6, 7 and 7ª, or the conduit may be entirely separate from the rails, as represented in Figs. 8 and 9.

As illustrated by Figs. 6, 7 and 7ª, the conduit consists primarily of two sides S' and S² respectively, connected by the bottom B to form a box-like structure. In the upper part of this structure supports or chairs C² are arranged at intervals, said chairs being firmly secured to the sides S' and S², and the lower parts T of the said chairs, forming a brace to strengthen the side walls. On the said chairs is secured a cover D preferably consisting of U-shaped beams on which is placed a covering of metal plates, wood, cement, asphalt or other suitable material. The chairs are further formed with or carry fish-plates $l$. The stems of the rails R' are held between the side wall S' and the fish plates $l$, and are secured in the usual manner. It will be seen that the rails R' need not be provided with an enlarged base portion. In the upper part of the conduit are arranged the usual insulating supports K provided with arms L to carry the conductor I². The chairs C² impart a great rigidity to the entire structure, and enable the conduit to carry the load that may rest on the rail R', without bending to any material extent. In order to further stiffen the conduit and especially the side wall S' to which the rail R' is secured, ribs $m$ may be provided on the outside of the said wall S', at the points where the chairs C² are located. Similar ribs or flanges may be provided at the ends of the conduit sections to connect the same by means of bolts or the like. The rail R² may be connected to the side wall S² of the conduit by means of braces $n$. It will be understood that this sectional conduit may be employed for electric railways of various systems, that each of the rails may be supported on a conduit, or the construction of the conduit may be modified without departing from the nature of my invention. The sectional conduit, however, will be of special advantage when employed in conjunction with my hereinbefore described sectional conductor, as the conduit sections can be constructed and fitted complete in the shops with a conductor section in each of the conduit sections. The rail $R^2$ (Figs. 6 and 7) may for instance be employed as a conductor, corresponding to the construction shown in Figs. 4 and 5, and the underground conductor $I^2$ would then be the equivalent of the overhead conductor $I'$ shown in Fig. 5.

When it is desired to transform any existing railway into an electrical railway with underground conductor, the conduits are arranged entirely separate from the rails. Fig. 8 shows a sectional conduit arranged exteriorly of the track, on the outside of the rail $R^2$. The construction of this conduit is substantially the same as that of the conduit shown in Fig. 6 with the exception that the fish-plate $l$ is omitted. As the conduit in this case has not to support the weight of the cars passing over it, it can be made comparatively light. The conduit may be placed between the rails if desired.

In Fig. 9 I have shown a conduit for two underground conductors, each section of said conduit consisting of side walls $S'$ $S^2$ and a bottom B formed integral therewith, a double support $C'$ whose lower part T is arranged approximately in the center of the conduit, and U-shaped beams D spaced from each other to leave a slot for the passage of the contact arms. The conductors are indicated at I and $I'$ respectively. They may be sectional conductors of the above described construction or continuous conductors of the usual kind.

I do not limit myself to the exact constructions shown in the drawings, as various changes may be made within the scope of the invention.

What I claim, and desire to secure by Letters Patent, is—

1. In an electric railway, the combination, with two corresponding adjacent sections of each of the conductors, of a rotatable circuit closer having a surface made partly of an insulating and partly of a conducting material, and stationary contact pieces adapted for continuous sliding contact with the said surface of the circuit closer, and connected to the said adjacent sections of the conductors, the said contact pieces and the insulating and conducting portions of the circuit closer being so arranged relatively to each other that the adjacent sections of one conductor are connected when the corresponding sections of the other conductor are disconnected, and vice versa, substantially as described.

2. In an electric railway, the combination, with two corresponding adjacent sections of each of the conductors, of a rotatable circuit closer provided with a shaft carrying arms adapted to be actuated by the cars, said circuit closer having a surface made partly of an insulating and partly of a conducting material, and stationary contact pieces adapted for continuous sliding contact with the said surface of the circuit closer, and connected to the said adjacent sections of the conductors, the said contact pieces and the insulating and conducting portions of the circuit closer being so arranged relatively to each other that the adjacent sections of one conductor are connected when the corresponding sections of the other conductor are disconnected, and vice versa, substantially as described.

3. The combination, with two corresponding adjacent sections of each of the conductors, of a rotatable circuit closer having a continuous cylindrical surface made partly of an insulating and partly of a conducting material, and stationary contact pieces adapted for continuous sliding engagement with the cylindrical surface of the circuit closer, and connected to the said adjacent sections of the conductors, the contact pieces connected to sections of the same conductor being placed apart a smaller distance than the length of the conducting portion of the circuit closer, as and for the purpose set forth.

4. In an electric railway, a tubular conduit for an underground conductor, a support or chair located within the conduit above the bottom thereof and secured with its respective ends to the sides of the conduit, and a fish plate formed on or secured to the said chair, to fasten a track rail in position on the conduit, substantially as described.

5. In an electric railway, a tubular conduit for an underground conductor, a support or chair located within the conduit above the bottom thereof and secured with its respective ends to the sides of the conduit, and a fish plate formed on or secured to the said chair and extending adjacent to one of the side walls of the conduit, to permit of securing a track rail between the said side wall and the said fish plate, substantially as described.

6. A conduit for underground conductors of electric railways, consisting of tubular sections provided with supports connecting the sides of the sections above the bottom thereof, and longitudinal beams carried by the said supports and constructed to receive the covering of the conduit, as and for the purpose set forth.

In testimony that I claim the foregoing as my invention I have signed my name in presence of two witnesses.

MICHELANGELO CATTORI.

Witnesses:
FERDINANDO DE PALMA,
CHARLES M. WOOD.